(12) United States Patent
Samanta

(10) Patent No.: US 11,101,722 B2
(45) Date of Patent: Aug. 24, 2021

(54) SEGMENTED STATOR FOR A DIRECT DRIVE ELECTRICAL GENERATOR

(71) Applicant: SIEMENS GAMESA RENEWABLE ENERGY A/S, Brande (DK)

(72) Inventor: Subhra Samanta, Ikast (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 442 days.

(21) Appl. No.: 16/021,428

(22) Filed: Jun. 28, 2018

(65) Prior Publication Data
US 2019/0058380 A1    Feb. 21, 2019

(30) Foreign Application Priority Data
Aug. 16, 2017 (EP) .................... 17186471

(51) Int. Cl.
| | |
|---|---|
| *H02K 1/14* | (2006.01) |
| *H02K 15/12* | (2006.01) |
| *H02K 3/30* | (2006.01) |
| *H02K 3/28* | (2006.01) |
| *H02K 1/16* | (2006.01) |
| *H02K 15/06* | (2006.01) |

(Continued)

(52) U.S. Cl.
CPC .............. *H02K 15/12* (2013.01); *H02K 1/148* (2013.01); *H02K 1/16* (2013.01); *H02K 3/28* (2013.01); *H02K 3/30* (2013.01); *H02K 15/066* (2013.01); *H02K 3/18* (2013.01); *H02K 7/1838* (2013.01); *H02K 2213/12* (2013.01)

(58) Field of Classification Search
CPC ............ H02K 15/12; H02K 1/14; H02K 1/16; H02K 3/28; H02K 3/30
See application file for complete search history.

(56) References Cited

U.S. PATENT DOCUMENTS

| | | | |
|---|---|---|---|
| 2005/0104252 A1 | 5/2005 | Hirai et al. | |
| 2010/0187939 A1 | 7/2010 | Stiesdal | |

(Continued)

FOREIGN PATENT DOCUMENTS

| | | |
|---|---|---|
| CN | 1625828 A | 6/2005 |
| CN | 102570655 A | 7/2012 |

(Continued)

OTHER PUBLICATIONS

Office Action in related Chinese Patent Application No. 201810934953. 3; dated Feb. 3, 2020; 10 pages.

*Primary Examiner* — Thienvu V Tran
*Assistant Examiner* — Lorena D Bruner
(74) *Attorney, Agent, or Firm* — Schmeiser, Olsen & Watts LLP

(57) ABSTRACT

A method of manufacturing a segment for a stator of an electrical generator includes manufacturing a segment body circumferentially extending between at least a first end slot and a second end slot, providing the coil concentrated winding in the slots of the segment body, providing a first pressure plate a second pressure plate for respectively holding the coil in the first end slot and the second end slot, applying vacuum pressure impregnation to the coil concentrated winding in the slots of the segment body, and removing the first pressure plate and the second pressure plate for obtaining the segment.

12 Claims, 4 Drawing Sheets

(51) Int. Cl.
*H02K 3/18* (2006.01)
*H02K 7/18* (2006.01)

(56) References Cited

U.S. PATENT DOCUMENTS

| | | | |
|---|---|---|---|
| 2011/0210640 A1* | 9/2011 | Elser | H02K 3/30 310/208 |
| 2012/0146434 A1 | 6/2012 | Nonaka | |
| 2015/0084454 A1 | 3/2015 | Noer | |
| 2015/0222151 A1 | 8/2015 | Semken et al. | |

FOREIGN PATENT DOCUMENTS

| | | |
|---|---|---|
| CN | 104518579 A | 4/2015 |
| CN | 104969444 A | 10/2015 |
| DE | 102011006918 A1 | 10/2012 |
| DE | 102016005320 A1 | 7/2017 |
| SU | 733065 A1 | 5/1980 |

\* cited by examiner

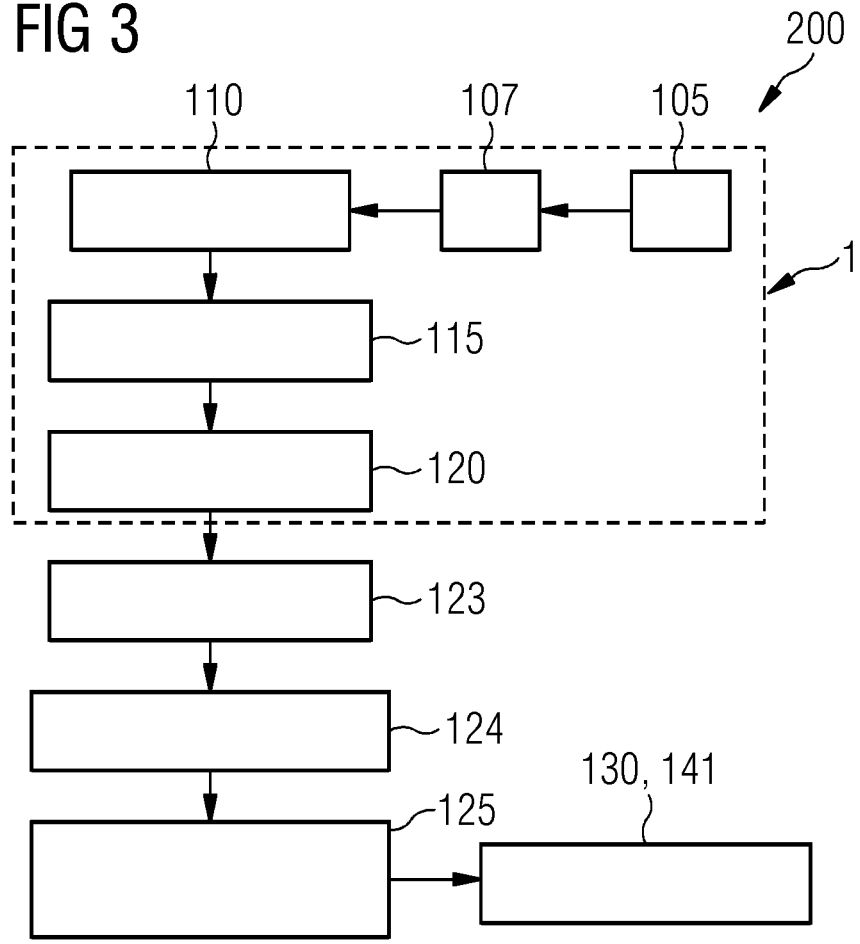
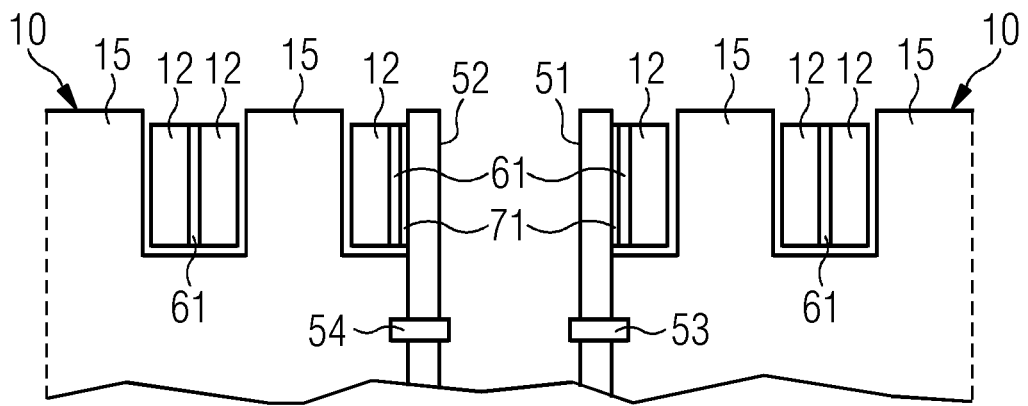

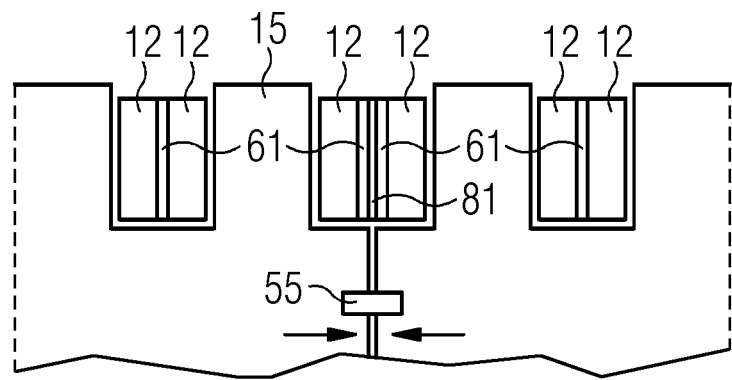
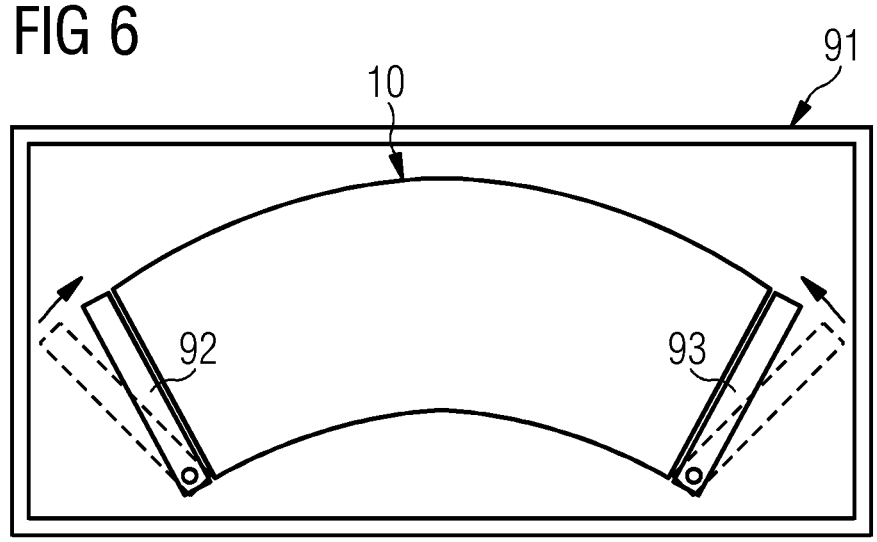

SEGMENTED STATOR FOR A DIRECT DRIVE ELECTRICAL GENERATOR

CROSS-REFERENCE TO RELATED APPLICATIONS

This application claims priority to European application No. EP17186471 having a filing date of Aug. 16, 2017, the entire contents of which are hereby incorporated by reference.

FIELD OF TECHNOLOGY

The following relates to a segmented stator for a direct drive electrical generator, e.g. a direct drive electrical generator for a wind power turbine. Embodiments of the present invention also relate to a method of manufacturing a segmented stator. Embodiments of the present invention further relate to a method of manufacturing a stator segment for a segmented stator.

BACKGROUND

An electrical generator, such as an electric generator installed in a wind turbine, typically comprises a rotor which rotates relative to a stator.

The stator normally comprises a frame body longitudinally extending along a longitudinal axis and including a stator yoke and a plurality of teeth protruding according to a radial direction from the stator yoke. In the stator a plurality of slots are also defined, each slot being delimited circumferentially by two adjacent teeth and radially extending between the stator yoke and respective tooth radial ends. Each slot houses a respective winding.

In this technical field, it is further known to build direct drive electrical generators, in particular large direct drive electrical generators to be used in a wind power turbine, including a stator having a segmented structure. The stator segments may be arranged to cover for example an arc of 30, 60, 90, 120 degrees (or any other angle) along the circumferential direction of the stator. The stator segments are circumferentially joined together to form the stator (for example a stator may comprise six stator segments, each covering an arc of 60 degrees).

For such type of stator it may be desirable to use a concentrated winding topology, which has shown benefits due to smaller coil overhang. In particular, an increase of the torque may be obtained in comparison with a stator having the total axial length, i.e. a length comprising the active length and the overhang length, but characterized by a distributed winding topology.

For such type of stator using a concentrated winding topology, it may be further desirable to manufacture segments already including the windings, to be joined together in a subsequent step of the manufacturing process to form the complete stator with windings.

The main inconvenience of such procedure is to secure the end coil of each segment. Due to the coil design topology, at each of its extreme circumferential ends the stator segment must comprise a respective slot and not a tooth. This happens because each coil from one slot has to enter the next adjacent slot. If half teeth were used at the extreme circumferential ends the stator, each half tooth to be joined to a correspondent half tooth of an adjacent segment, the slots of the stator segment adjacent to the half teeth would be half empty, as the empty half would have to include windings from the adjacent stator segment. The same if one slot would be provided at one circumferential end of the stator segment (with a tooth provided at the other circumferential end of the stator segment). This is obviously in contrast with the requirement of manufacturing complete segments already including the windings, to be joined together to form the complete stator.

A possible constructional alternative would be that of introducing a dummy tooth or dummy half tooth at the circumferential ends of the stator segment. This solution however is not efficient as the intended electromagnetic performance would be lost and in addition would produce more torque ripple.

Therefore, there is still a need to provide a stator design combining efficiently the concentrated winding topology with a segmented design of the stator.

SUMMARY

According to a first aspect of embodiments of the present invention, it is provided a method of manufacturing a stator segment for a stator of an electrical generator, the stator segment including a segment body and a coil concentrated winding, the method including:
a first step of manufacturing a segment body circumferentially extending between at least a first end slot and a second end slot, each of the first end slot and of the second end slot being circumferentially extended between at least a tooth of the segment body and a respective first side opening and second side opening, the segment body circumferentially spanning between the first side opening and the second side opening,
a second step of providing the coil concentrated winding in the slots of the segment body,
a third step of providing a first pressure plate at the first side opening and a second pressure plate at the second side opening for respectively holding the coil in the first end slot and the second end slot,
a fourth step of applying vacuum pressure impregnation to the coil concentrated winding in the slots of the segment body,
a fifth step of removing the first pressure plate and the second pressure plate for obtaining the stator segment.

According to a second aspect of embodiments of the present invention it is provided a stator segment for a stator of an electrical generator including:
a segment body circumferentially extending between at least a first end slot and a second end slot, each of the first end slot and of the second end slot being circumferentially extended between at least a tooth of the segment body and a respective first side opening and second side opening, the segment body circumferentially spanning between the first side opening and the second side opening,
a coil concentrated winding in the slots of the segment body.

In particular such stator segment may be obtained through the above described method of manufacturing a stator segment for a stator of an electrical generator.

According to a third aspect of embodiments of the present invention it is provided a method of manufacturing a stator of an electrical generator including:
manufacturing a plurality of stator segments as described above,
joining circumferentially together the plurality of segments in such a way that a first end slot of one stator segment of the plurality of stator segments is adjacent to the second end slot of another stator segment of the plurality of stator segments.

According to a fourth aspect of embodiments of the present invention it is provided a stator of an electrical generator obtained through the above described method. Particularly, the stator according to embodiments of the present invention includes a plurality of slots, the circumferential extension of the first end slot and the second end slot of each stator segments being the half of the circumferential extension of each slot of the stator.

The above described electric generator including the stator of embodiments of the present invention may be advantageously integrated in a wind turbine.

Advantageously, the coil in the first end slot and the second end slot of the stator segment are secured by the first pressure plate and the second pressure plate, respectively, during the step of applying vacuum pressure impregnation to the the stator segment.

According to embodiments of the invention, the method of manufacturing a stator segment further comprises, between the third step and the fourth step, a first intermediate step of providing at least a phase separator between the first pressure plate or the second pressure plate and the coil in the first end slot or the second end slot, respectively.

Advantageously, this permits to manufacture a segment stator including phase separators already attached to the end slots.

Particularly, according to an embodiments of the invention, the method above described may further include, between the third step and the fourth step, a second intermediate step of providing at least a plastic foil separating the first pressure plate or the second pressure plate from the coil in the first end slot or the second end slot, respectively, or from the phase separator.

Advantageously, the plastic foil permits an easy removal of the first pressure plate and of the second pressure plate from the coil, once vacuum pressure impregnation has been applied.

According to further embodiments of the invention, joining circumferentially together the plurality of stator segments includes a sixth step of inserting a joining element between the first end slot of one stator segment and the second end slot of another adjacent stator segment for fixing said one stator segment to said adjacent stator segment.

In case the stator segments include phase separators already attached to the end slots, the joining element may be a partially cured resin impregnated insulation layer. In such cases joining circumferentially together the plurality of stator segments further includes a seventh step of fixing said one segment to said adjacent stator segment by mechanically pressing said one segment against said adjacent stator segment.

In case the stator segments do not include phase separators already attached to the end slots, the joining element may a fiber glass insulator strip. In such case joining circumferentially together the plurality of segments includes a seventh step of fixing said one stator segment to said adjacent stator segment by pouring a room temperature curing resin on the fiber glass insulator strip.

According to further embodiments of the invention, a housing box for storing and/or transporting at least one stator segment may be provided.

Particularly, in the housing box a first support plate and a second support plate may be provided, the first support plate and the second support plate being hinged to the housing box, the first support plate and the second support plate being respectively usable for supporting the coil in the first end slot and of the second end slot when the housing box houses one stator segment. During storing and/or transporting the function of the support plates is analogous to the function of the pressure plates during vacuum pressure impregnation.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter, also any combination between features relating to different subject matters, in particular between features of the apparatus type claims and features of the method type claims, is considered as to be disclosed with this application.

The aspects defined above and further aspects of the present embodiments of the invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein FIG. 1 shows a front view orthogonal to an axial direction of a stator segment;

FIG. 3 shows a second block scheme of a second embodiment of a method of manufacturing a stator of an electrical generator;

FIG. 4 illustrates steps of the method of FIG. 2;

FIG. 5 illustrates further steps of the method of FIG. 2;

FIG. 6 shows a top view of a device to be used when executing the method of FIG. 3;

DETAILED DESCRIPTION

Figure 1:
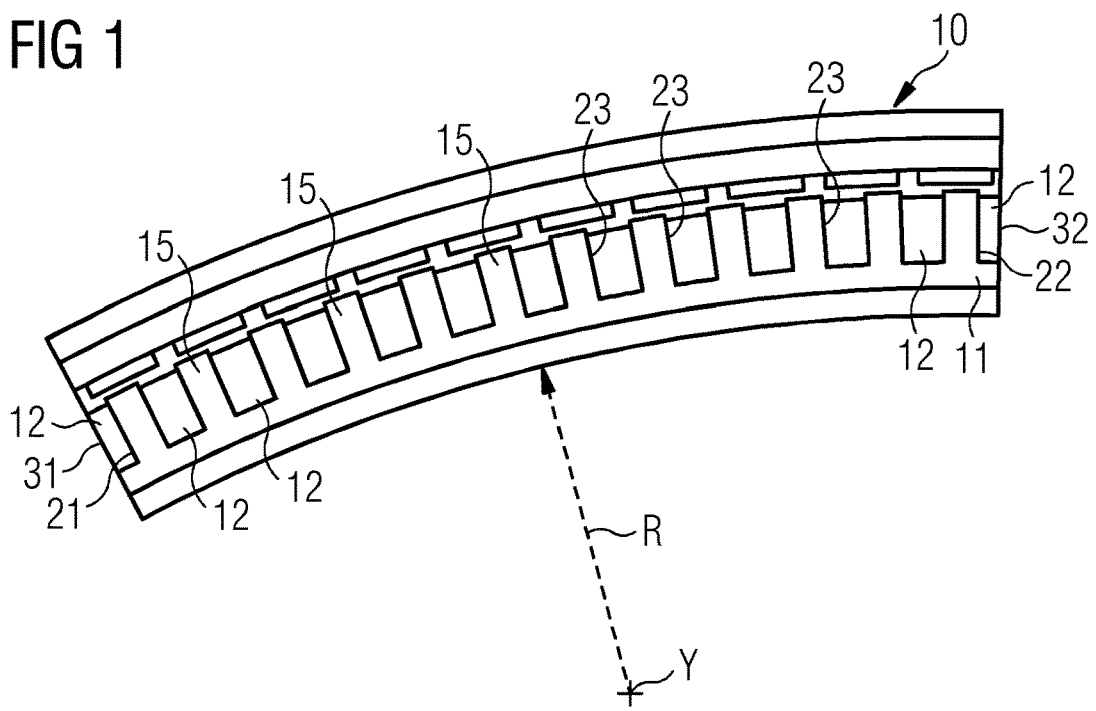

The illustrations in the drawings are schematic. It is noted that in different figures, similar or identical elements are provided with the same reference signs.

A stator for an electrical generator (not represented as a whole in the attached figures) comprises a plurality of stator segments 10.

With reference to FIG. 1, a stator segment 10 comprises a segment body 11 longitudinally extending along a longitudinal axis Y (perpendicular to the plane of FIG. 1) of the stator. The terms axial (or longitudinal) radial and circumferential in the following are made with reference to the longitudinal axis Y of the stator.

The stator segment 10 has a conventional structure comprising a plurality of teeth 15 protruding according to a radial direction R orthogonal to the longitudinal axis Y from the segment body 11. The stator segment 10 further comprises a plurality of intermediate slots 23, each slot 23 circumferentially extending between two respective teeth 15, a first end slot and a second end slot 22. The segment body 11 circumferentially extends between the first end slot 21 and the second end slot 22, each of the first end slot 21 and of the second end slot 22 being circumferentially extended between a respective tooth 15 (respectively, the first tooth 15 and the last tooth 15 of the stator segment 10) of the segment body 11 and a respective first side opening 31 and second side opening 32 of the segment body 11. The segment body 11 circumferentially spans between the first side opening 31 and the second side opening 32.

The stator segment 10 further comprises coil concentrated windings 12 in the slots 21, 22, 23 of the segment body 11.

According to the different embodiments of a stator segment 10 according to embodiments of the present invention, the stator segment 10 may include any number of intermediate slots 23 circumferentially comprised between the first end slot 21 and the second end slot 22. The circumferential extension of the first end slot 21 and the second end slot 22 is the half of the circumferential extension of the intermediate slot 23.

According to a possible embodiment of the present invention, the smallest version of the stator segment 10 according to the present invention includes only one tooth between the first end slot 21 and of the second end slot 22, i.e. without any intermediate slot 23.

Figure 2:
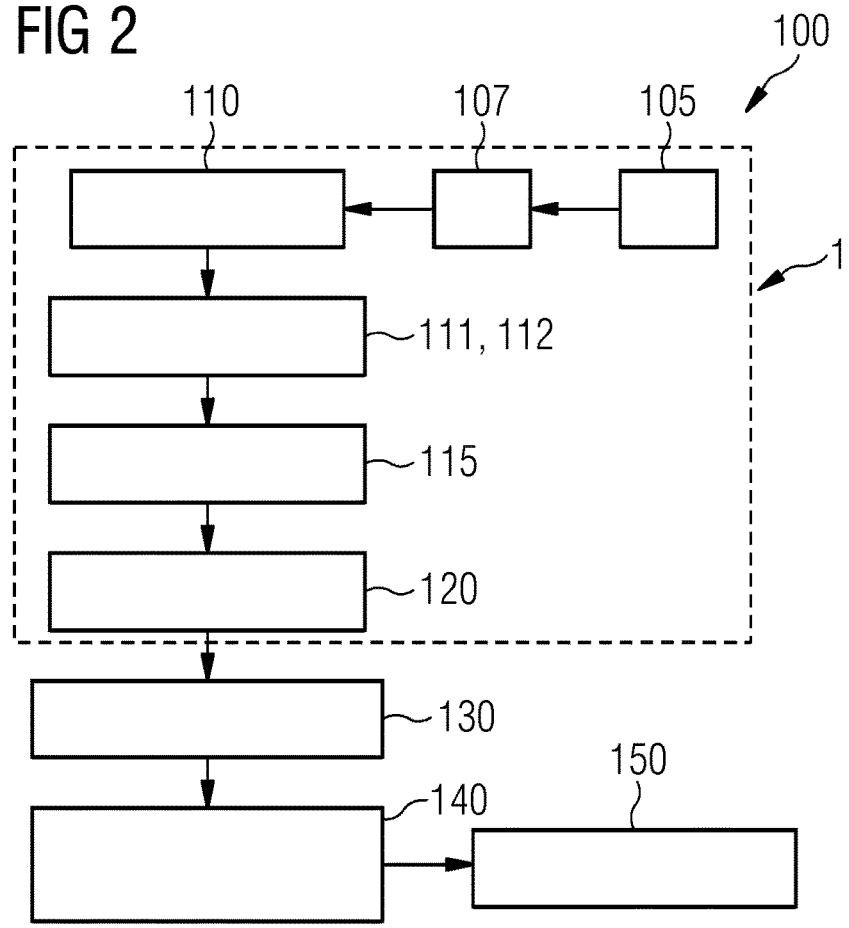
FIG. 2 shows a first block scheme of a first embodiment of a method of manufacturing a stator of an electrical generator.

With reference to FIGS. 2 and 3, the stator segment 10 may be manufactured according to following method 1.

In a first step 105 of the method 1, the segment body 11 is manufactured.

In a second step 107 of the method 1, the coil concentrated winding 12 is provided in the slots 21, 22, 23 of the segment body 11.

In a third step 110 of the method 1, a first pressure plate 51 is provided at the first side opening 31 and a second pressure plate 52 is provided at the second side opening 32 for respectively holding the coil in the first end slot 21 and in the second end slot 22. In FIG. 4 it is shown that the first pressure plate 51 is provided at the first side opening 31 of one stator segment 10 and the second pressure plate 52 is provided at the second side opening 32 of another stator segment 10. However, according to embodiments of the present invention, both the first pressure plate 51 and the second pressure plate 52 are applied at the respective first side opening 31 and second side opening 32 of the same stator segment 10. Mechanical hardware 53, 54, schematically represented in FIG. 4 with two blocks, are provided between the pressure plates 51, 52 and the stator segment 10 to connect mechanically the pressure plates 51, 52 to stator segment 10 at the respective first side opening 31 or second side opening 32.

Figure 7:
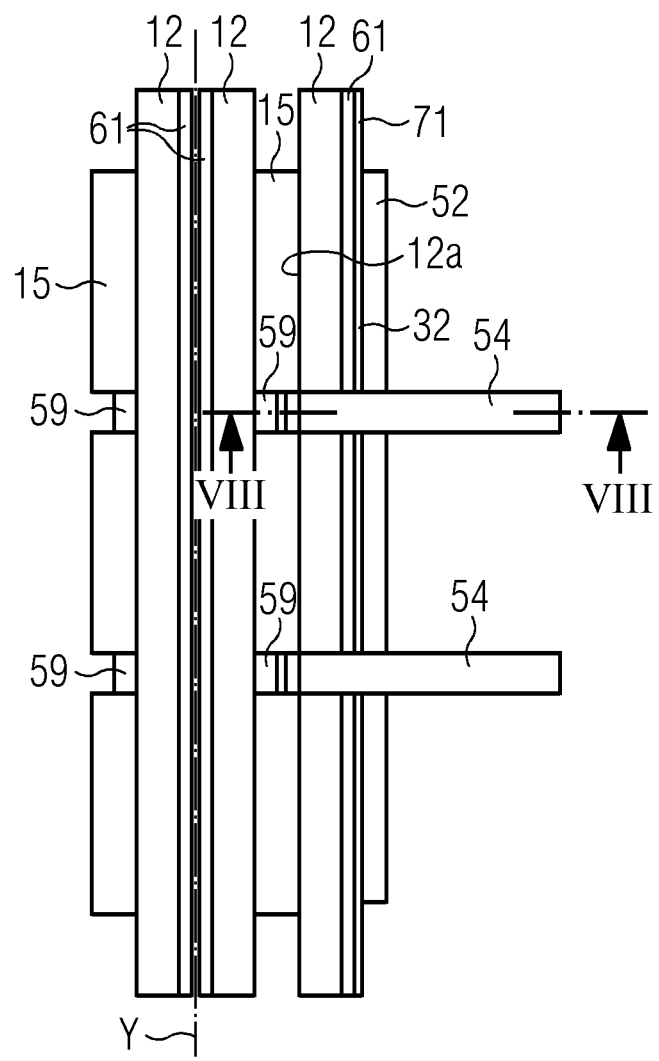
FIG. 7 shows a partial top longitudinal view, along the axial direction, of a compete stator.
Figure 8:
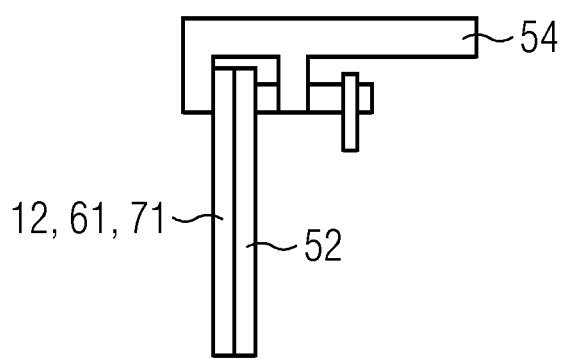
FIG. 8 shows a sectional view of the stator of FIG. 7, taken according to the sectional line VIII-VIII of FIG. 7.

One example of mechanical hardware 53, 54 constituted by a clamp is shown in FIGS. 7 and 8. Each clamp 53, 54 is active between the respective first side opening 31 or second side opening 32 and a back surface 12a of the the coil concentrated winding 12 in the first end slot 21 or the second end slot 22, respectively. The back surface 12a of the coil concentrated winding 12 is accessible at respective air duct 59, which are provided stator segment 10 orthogonally to the longitudinal axis Y. Therefore, each clamp 53, 54 is applied at one respective air duct 59.

In a fourth step 115 of the method 1, vacuum pressure impregnation (VPI) is applied to the stator segment 10 and in particular to the coil concentrated winding 12 previously provided (with the second step 107 of the method) in the slots 21, 22, 23 of the segment body 11.

In a fifth step 120 of the method 1, after vacuum pressure impregnation is completed, the first pressure plate 51 and the second pressure plate 52 are removed. The resin used in the vacuum pressure impregnation technique assures that the coil windings 12 in the end slot 21, 22 are held in place, also when the pressure plates 51, 52 are removed. At the end of the fifth step 120 the stator segment 10 according to embodiments of the present invention are obtained.

With only reference to FIG. 2, in a possible first variant of the above described method 1, further method steps are comprised between the third step 110 and the fourth step 115 above described.

In particular, in a first intermediate step 111 a phase separator 61 is provided between the first pressure plate 51 and the coil in the first end slot 21 and another phase separator 61 is provided between the second pressure plate 52 and the second end slot 22. This permits, at the end of fifth step 120 above described, to obtain a stator segment 10 including two phase separator 61, respectively at the first side opening 31 and at the second side opening 32. In a second intermediate step 112 a plastic foil 71 is provided for separating the first pressure plate 51 from the coil in the first end slot 21 and another plastic foil 71 is provided for separating the second pressure plate 52 from the second end slot 22. When phase separators 61 are used, plastic foils 71 are inserted between phase separators 61 and the pressure plates 51, 52. As plastic foil 71 it is preferably chosen a foil of a material which is not adhering to the resin used during vacuum pressure impregnation in the fourth step 115 of the method. This assures an easy removal of the pressure plates 51, 52 during the fifth step 120 of the method 1.

With reference to FIGS. 2 and 3 respectively, two embodiments 100, 200 of a method of manufacturing a stator of an electrical generator are described in the following.

In general, for all the embodiments according to the present invention, a method of manufacturing a stator of an electrical generator includes first manufacturing a plurality of stator segments 10 through the step of the method 1 of manufacturing a stator segment 10 above described. In particular the method 1 may include the sequence of first step 105, second step 107, third step 110, fourth step 115 and fifth step 120 (as shown in FIG. 3) or the sequence of first step 105, second step 107, third step 110, first intermediate step 111, second intermediate step 112, fourth step 115 and fifth step 120 (as shown in FIG. 2). After the method 1 of manufacturing a stator segment 10 has been completed, the method 100, 200 include a phase of joining circumferentially together the plurality of segments 10 in such a way that the first end slot 21 of one stator segment 10 is adjacent to the second end slot 22 of another stator segment. Such phase of joining includes a sixth step 130 of inserting a joining element 81 between the first end slot 21 of one stator segment 10 and the second end slot 22 of another adjacent stator segment 10 for fixing the two stator segments 10 to one another.

With reference to FIGS. 2 and 5, a first embodiment 100 of the method of manufacturing a stator of an electrical generator is applied after a plurality of stator segments 10, which include phase separators 61 at the first side opening 31 and at the second side opening 32, have been manufactured. In such embodiment the joining element 81 used at the sixth step 130 of the method 100 is a partially cured resin impregnated insulation layer. The phase of joining circumferentially together the plurality of stator segments 10 includes after the sixth step 130 a subsequent seventh step 140 of fixing one segment 10 to the adjacent stator segment 10 by mechanically pressing the two stator segments 10 against one another. The application of pressure between the last two coils of the adjacent stator segments 10 is needed so that resin can come out from the resin impregnated insulation layer 81 and join together the coil windings 12 in the first end slot 21 of one stator segment 10 and the second end slot 22 of the adjacent stator segment 10.

Further mechanical hardware 55, schematically represented in FIG. 5 with a block, is provided between the two stator segments 10 to press them against one another. At the end of the seventh step 140 a stator (not represented in the attached figure) is obtained having a plurality of slots 23, which have all the same circumferential extension. At the interface between two adjacent stator segments 10, a slot 23 is constituted by one first end slot 21 of one stator segments 10 and one second end slot 22 of another stator segment 10, joined together. An eighth step 150 of the method 100 is performed to provide a plurality of wedges 40 at the radial end of the slots 23 and to fix the wedges 40 to the stator by pouring a room temperature curing resin over the wedges 40.

With reference to FIGS. 3 and 6, a second embodiment 200 of the method of manufacturing a stator of an electrical generator is applied after a plurality of stator segments 10, which do not include phase separators 61, have been manufactured. In such embodiment, the joining element 81 is a fiber glass insulator strip. The phase of joining circumferentially together the plurality of segments 10 includes a seventh step 141 of fixing one stator segment 10 to an adjacent stator segment 10 by pouring a room temperature curing resin on the fiber glass insulator strip 81. The room temperature curing resin glues with glass fiber laminates the coil windings 12 in the first end slot 21 of one stator segment 10 and the second end slot 22 of the adjacent stator segment 10. At the end of the seventh step 140 a stator (not represented in the attached figure) is obtained having a plurality of slots 23, which have all the same circumferential extension. At the interface between two adjacent stator segments 10, a slot 23 is constituted by one first end slot 21 of one stator segments 10 and one second end slot 22 of another stator segment 10, joined together.

Optionally, after the fifth step 120 and before sixth step 130, the method 100, 200 may further include a plurality of steps.

In particular, it may be provided a housing box 91 (FIG. 6) for storing and/or transporting one or more stator segments manufactured with the method 1. In the housing box 91 a first support plate 92 and a second support plate 93 are provided, hinged to the housing box 91. The first support plate 92 and the second support plate 93 are respectively usable for supporting the coil in the first end slot 21 and of the second end slot 22 when the housing box 91 houses one stator segment 10. During storing and/or transporting the function of the support plates 92, 93 is analogous to the function of the pressure plates 51, 52 during the vacuum pressure impregnation applied at the fourth step 115 of the method 1. When housing boxes 91 are being used for storing and/or transporting, the method 100, 200 includes, before the sixth step 130, a sub-assembly phase 124, 125 for joining circumferentially together the plurality of stator segments 10.

When a housing box 91 is used for transporting a stator segments, the pressure plate 51, 52 are removed after the vacuum pressure impregnation step and the stator segments 10 is placed inside the housing box 91, between the support plates 92, 93. The stator segments 10 will be removed from the housing box 91 just before assembly process to form the complete stator as detailed in the following.

The sub-assembly phase 124, 125 comprises:
a step of extracting 124 one segment stator 10 from a respective housing box 91 and placing the stator segment 10 adjacent to another stator segment 10 or between two adjacent stator segments 10,
a further step of mechanically connecting 125 the segment stators 10 together. After the sub-assembly phase 124, 125 the sequence of sixth 130 step, seventh step 140 and eighth step 150 or the sequence of sixth 130 step and seventh step 141 may be applied to complete the manufacturing of the stator of embodiments of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing a stator segment for a stator of an electrical generator, the stator segment including a segment body and a coil concentrated winding, the method including:
   manufacturing a segment body circumferentially extending between at least a first end slot and a second end slot, each of the first end slot and of the second end slot being circumferentially extended between at least a tooth of the segment body and a respective first side opening and a second side opening, the segment body circumferentially spanning between the first side opening and the second side opening;
   providing the coil concentrated winding in slots of the segment body;
   providing a first pressure plate at the first side opening and a second pressure plate at the second side opening for respectively holding the coil concentrated winding in the first end slot and the second end slot;
   applying vacuum pressure impregnation to the coil concentrated winding in the slots of the segment body; and
   removing the first pressure plate and the second pressure plate for obtaining the stator segment.

2. The method of manufacturing the stator segment as claimed in claim 1, further comprising between the third step and the fourth step:
   providing at least a phase separator between the first pressure plate or the second pressure plate and the coil concentrated winding in the first end slot or the second end slot, respectively.

3. The method of manufacturing the stator segment as claimed in claim 2, further comprising between the third step (and the fourth step:
   providing at least a plastic foil separating the first pressure plate or the second pressure plate from the coil concentrated winding in the first end slot or the second end slot, respectively, or from the phase separator.

4. A method of manufacturing a stator of an electrical generator including: manufacturing a plurality of stator segments through the method as claimed in claim 1, and joining circumferentially together the plurality of segments in such a way that a first end slot of one stator segment of the plurality of stator segments is adjacent to the second end slot of another stator segment of the plurality of stator segments.

5. The method of manufacturing a stator as claimed in claim 4, wherein joining circumferentially together the plurality of stator segments includes: inserting a joining element between the first end slot of one stator segment and the second end slot of another adjacent stator segment for fixing the one stator segment to the adjacent stator segment.

6. The method of manufacturing a stator as claimed in claim 5, wherein the joining element is a partially cured resin impregnated layer and wherein joining circumferentially together the plurality of stator segments includes fixing the one segment to the adjacent stator segment by mechanically pressing the one segment against the adjacent stator segment.

7. The method of manufacturing a stator as claimed in claim 5, wherein the joining element is a fiber glass insulator strip and wherein joining circumferentially together the plurality of segments includes fixing the one stator segment to the adjacent stator segment by pouring a room temperature curing resin on the fiber glass insulator strip.

8. The method of manufacturing a stator as claimed in claim 4, further comprising providing a housing box for storing and/or transporting at least one stator segment of the plurality of stator segments.

9. The method of manufacturing a stator as claimed in claim 8, wherein in the housing box a first support plate and a second support plate are provided, the first support plate and the second support plate being hinged to the housing box, the first support plate and the second support plate being respectively usable for supporting the coil in the first end slot and of the second end slot when the housing box houses one stator segment.

10. The method of manufacturing a stator as claimed in claim 8, wherein joining circumferentially together the plurality of stator segments includes a sub-assembly phase before the inserting a joining element, the sub-assembly phase comprising:
   extracting one segment stator from a respective housing box and placing the stator segment adjacent to at least another stator segment, and
   mechanically connecting the one segment stator with another stator segment.

11. A stator of an electrical generator including a plurality of stator segments manufactured according to the method of claim 1, wherein the plurality of segments are circumferentially joined together in such a way that a first end slot of one stator segment of the plurality of stator segments is adjacent to the second end slot of another stator segment of the plurality of stator segments.

12. The stator of an electrical generator as claimed in claim 11, wherein the stator includes a plurality of slots, the circumferential extension of the first end slot and the second end slot of each stator segments being the half of the circumferential extension of each slot of the stator.

\* \* \* \* \*